United States Patent [19]

Yamazaki

[11] Patent Number: 4,932,718
[45] Date of Patent: Jun. 12, 1990

[54] COUPLED CHAIR UNIT CONVERTIBLE TO A CHAIR MODE AND TO A DESK MODE

[75] Inventor: Ryokichi Yamazaki, Tokyo, Japan

[73] Assignee: Kotobuki Seating Company, Ltd., Tokyo, Japan

[21] Appl. No.: 417,218

[22] Filed: Oct. 4, 1989

[30] Foreign Application Priority Data

Mar. 31, 1989 [JP] Japan ............................ 1-39123[U]
Mar. 31, 1989 [JP] Japan ............................ 1-39125[U]

[51] Int. Cl.⁵ ............................................. A47B 39/00
[52] U.S. Cl. ................................ 297/146; 297/191; 297/232
[58] Field of Search ................ 297/146, 191, 232, 114

[56] References Cited

U.S. PATENT DOCUMENTS

| | | | |
|---|---|---|---|
| 2,951,531 | 9/1960 | Dantes | 297/191 X |
| 3,393,008 | 7/1968 | Bendell | 297/146 |
| 3,813,147 | 5/1974 | Rick | 297/146 X |
| 3,879,085 | 4/1975 | Morel | 297/191 X |
| 4,141,586 | 2/1979 | Göldner et al. | 297/191 |
| 4,536,027 | 8/1985 | Brennan | 297/146 X |

FOREIGN PATENT DOCUMENTS 61-30564  7/1986  Japan .................. 297/146

*Primary Examiner*—Peter A. Aschenbrenner
*Attorney, Agent, or Firm*—Nilsson, Robbins, Dalgarn, Berliner, Carlson & Wurst

[57] ABSTRACT

A coupled chair unit for conversion to a desk mode of use and to a chair mode of use comprises a plurality of legs, a beam member bridged over the legs, a plurality of armrests fixed on the beam member in a longitudinal direction of the beam member, a plurality of support posts uprightly fixed on the beam member and having first and second support portions provided in the upper and lower positions, respectively, a plurality of chair seats tiltably supported between the adjacent armrests, a plurality of chair backrests including upper and lower backrest segments, movable and fixed, which are situated above the respective chair seats, an upper backrest segment-equipped table panel which is held erect behind the support post and chair backrest in an ordinary chair mode of use and a link mechanism converting the coupled chair unit to the ordinary chair mode of use in which the table panel is held erect and to a desk mode of use in which the table panel is held substantially horizontal. The link mechanism comprises first links reverse-rotatable above the support post with a first support portion as a center, second links tiltable in a front direction with a second support portion as a center and table panel brackets for rotatably connecting the first link to the second link, in which the second link is made of a support post camouflaging member of a channel-like cross-section to be fitted over the support post.

5 Claims, 17 Drawing Sheets

COUPLED CHAIR UNIT CONVERTIBLE TO A CHAIR MODE AND TO A DESK MODE

BACKGROUND OF THE INVENTION

1. Field of the Invention

The present invention relates to a coupled chair unit which can be converted to a desk mode and to a chair mode on the floor of a lecture hall, a theator or a city hall.

2. Description of the Related Art

Japanese Patent Publication 61-30564 discloses a conventional coupled chair unit usable as both a chair mode and a desk mode. The conventional coupled chair unit comprises a plurality of legs fixedly located in a predetermined interval on the floor of an installation site, such as a lecture hall, a theator or a city hall, a beam member laterally fixed on the legs, a plurality of support posts uprightly fixed at a predetermined chair array interval on the beam member in the longitudinal direction of the beam member, a plurality of armrests fixed on the forward side of the respective support posts, a plurality of chair seats placed between the adjacent armrests and supported in a manner to be tiltably rotatable relative to the opposite armrests, a plurality of chair backrests provided at an upper portion of a back of the chair seat and table panels fixed on the rear surface of the backrest and dividable for each chair at the back of each backrest, and a link mechanism for converting a table panel backrest combination structure to a chair mode in which the structure is held rearwardly tilted behind the chair seat and to a desk mode in which the structure is held substantially horizontal. The link mechanism comprises first short links reverse-rotatably pin-connected to a first support portion at a near-top of the support post, second long links forwardly-tiltably pin-connected to a second support portion which is situated in the lower portion of the support post, and end brackets which allow the forward end portions of the first and second links to be pivotally supported relative to the table panel.

The conventional coupled chair unit can be used as a chair mode where persons can be seated and as a desk mode where a desk has a wide space. Normally, use of the chair mode prevails.

Even if the coupled chair unit can be used as both the chair mode and the desk mode, an outer appearance in the chair mode is important in practical use and, furthermore, the link mechanism, that is, the chair/desk conversion device is preferably never of such a type that it is unsightly when viewed in both a front/back direction and a right/left direction.

In the ordinary chair mode of use, however, the support posts are unsightly projected between the adjacent chair backrests with the first and second links exposed as flat plates on both sides of the respective support posts. Furthermore in the ordinary chair mode of use in which the table panel/backrest combination structure is held tilted rearwardly, the first and second links are externally exposed particularly in the front direction of the coupled chair unit and in the right/left direction, thus impairing an aesthetic appearance of the coupled chair unit.

SUMMARY OF THE INVENTION

A first object of the present invention is to provide a coupled chair unit excellent in aesthetic appearance which, in an ordinary chair mode in which an upper backrest segment-equipped table panel is held erect, can cover support posts and first links with second links of channel-like cross-section to camouflage the support posts and hence can hide them from view in a front direction and in a right/left direction.

A second object of the present invention is to provide a coupled chair unit of an enhanced aesthetic appearance which can not only hide support posts and first links from view but also hide upper and lower end pivots of support post-camouflaging links from view.

A third object of the present invention is to provide a coupled chair unit which, by giving an ingenious design to the mounting of first links on support posts, can reduce the width of the channel cross-section of table panel brackets fitted over the outer side of the support posts so as to prevent second links (support-camouflaging links) from being projected from an extension line of each side surface of armrests in a chair backrest direction and hence to reduce an armrest mount space between chair backrests to a necessary minimum extent.

A fourth object of the present invention is to provide a coupled chair unit of an aesthetic good design which, in an ordinary chair mode of use in which the chair backrest and table panel are held erect, compactly stores support posts and first and second links within a backrest recess so as to be hidden from view both in a front/back direction and in a right/left direction.

A fifth object of the present invention is to provide a coupled chair unit which can be made simple in construction by reducing the number of first links as well as the height of the intermediate support post.

A sixth object of the present invention is to provide a coupled chair unit which is enough strong to be used as a writing table.

According to a first aspect of the present invention, a coupled chair unit is provided which can effect a conversion to a desk mode and to a chair mode in which persons can be seated one by one, the coupled chair unit comprising:

chair support means composed of a plurality of legs fixedly arranged in a predetermined interval on a floor of a chair unit installation site, a long beam member extending is a lateral direction and mounted on the plurality of legs, a plurality of armrests fixedly mounted on the beam member at a predetermined chair array in a longitudinal direction of the beam, a plurality of support posts fixedly mounted erect on the beam member and extending up from behind at least two of the plurality of armrests and arranged in a spaced-apart relation in the longitudinal direction of the beam member, and chair support means having a first support portion provided at a near-top portion of the respective support post and a second support portion located at a place near to the armrest of the support post;

a plurality of chair seats provided between the adjacent armrests of the chair support means and tiltably supported relative to the opposite armrests;

a plurality of backrests having a fixed lower backrest segment and movable upper backrest segment which are located above the chair seat;

an upper backrest segment-equipped table panel having a length corresponding to that of the coupled chair unit and having the upper backrest segment fixed at the front side, the table panel being held upright behind the support post and chair backrest in an ordinary chair mode of use; and a link mechanism capable of moving the upper backrest segment-equipped table panel to the ordinary chair mode of use in which the table panel is held erect behind the support post and chair backrest with the movable upper backrest segment situated above the fixed lower backrest segment and to a desk mode of use in which the table panel is held substantially parallel with the movable upper backrest segment located over the chair seat, the link mechanism which comprises:

a plurality of table panel brackets of a channel cross-section having an intermediate pivot and forward end pivot and a stopper for holding the table panel horizontal and adapted to be fixed in a position corresponding to the support post of the table panel so as to be fitted over an outside of the support post from behind;

a plurality of first links of short length each having a base end portion it is reverse-rotatably pin-connected to the first support post and a forward end portion it is reverse-rotatably moved clear of the support post, the base end portion of the first link being reverse-rotatably pin-connected to the first support portion of the support post so as to be stored between the table panel bracket and the support post and the forward end portion of the first link being rotatably pin-connected to the intermediate pivot of the table panel bracket in the ordinary chair mode of use; and a plurality of second links of long length each having a base end portion it is tiltably pin-connected to the second support portion of the support post and a forward end portion extending up from the support post, the second links being of such a type that, in order to provide an outer camouflage in the ordinary desk mode of use, the base end portion is tiltably pin-connected to the second pivot and the forward end portion rotatably pin-connected to the forward end pivot of the table panel bracket.

In the aforementioned coupled chair unit thus constructed, the support post and first link are hidden from view, in the ordinary chair mode of use, by the second link, that is, the channel member for support post camouflage, and never seen both in a front/back direction and in the right/left direction. In this case, the second link appears as if it were the support post and gives an aesthetic appearance to the coupled chair unit as a whole.

The second links may be of such a type that the upper and lower pivots of the forward and base end portions, that is, the forward end portion pin-connected to the forward end pivot of the table panel bracket and base end portion pin-connected to the second support portion of the support post, are partially exposed. In order to improve an aesthetic appearance further, however, it is preferable to provide two pairs of link covers, one at an upper position and the other at a lower position, over the corresponding second links so that their forward and base end portions are not seen from an outside.

A second embodiment of the present invention includes such pairs of link covers. These link covers camouflage not only the support posts and first links but also the upper and lower end pivots of the second links so as not to be seen from an outside. This ensures an added aesthetic appearance to the coupled chair unit in the chair mode of use.

It may be possible that the respective support post comprises a single post formed of a hollow post member of a square cross-section. In this case, however, if first links are pivotally supported on both the upper side end portions of the hollow post member, the channel cross-section width of the table panel brackets fitted on the outer side of the support post and that of the support post-camouflaging links (second links) become greater so that the second links (support post camouflaging links) are projected, in a chair backrest direction, from an extension of each side surface of the armrest. It is, therefore, necessary to increase an armrest mount space between the chair backrests to that extent.

In the third embodiment of the present invention, the support posts as set forth above are composed of a hollow post member of a triangular cross-section which is uprightly fixed on the beam member and an upper post member fitted into an upper open end of the hollow post member to mount the first link there. A link mount recess is provided at each side of the link mount portion of the upper post member so that the first link is stored or held within the hollow post member of a rectangular cross-section. It is, therefore, possible to decrease the channel cross-section width of the table panel bracket to be fitted over the outside of the support post and that of the support camouflaging link (second link) fitted over the outside of the table panel bracket. It is also possible to decrease an armrest mount space between the chair backrests to a minimum possible extent because the second link (support post-camouflage link) is not projected, in a chair backrest direction, from an extension line of each side surface of the armrest.

According to the fourth embodiment of the present invention, there is provided a coupled chair unit capable of a conversion to a chair mode of use in which persons can be seated one by one on a seat unit and to a desk mode of use, comprising:

a plurality of legs fixedly arranged in a predetermined interval on a floor of chair unit installation site and a beam member mounted on the plurality of legs;

a plurality armrests fixedly mounted at a predetermined chair array in a longitudinal direction of the beam member;

a plurality of chair seats provided between the adjacent armrests and tiltably supported relative to the opposite armrests;

a plurality of chair backrests having a longitudinally extending channel-like recess at the middle of the rear side thereof and tiltably rotatable above the upper rear side of the chair seat;

a plurality of support posts uprightly fixed on the beam member in a position corresponding to the backrest recess of the chair backrest and a link storage section provided between the support post and the backrest recess;

a table panel having a length corresponding to that of the coupled chair unit and adapted to, in the ordinary chair mode of use, be held upright behind the support post and chair backrest; and a link mechanism adapted to convert the coupled chair unit to the ordinary chair mode of use in which the table panel and chair backrests are held erect and to the desk mode of use in which the table panel is held substantially horizontal with the chair backrest forwardly tilted, said mechanism comprising a plurality of first short links and plurality of second long links and table panel brackets for pivotally supporting the first and second links and all of them are compactly stored between the corresponding backrest recess and the corresponding support post so that they are hidden from view in an ordinary desk mode of use.

In the coupled chair unit so constructed, the respective support post and first and second links are stored within the recess of the chair backrest, in the ordinary chair mode of use in which the chair backrest and table panel are held erect, and hidden from view both in the front/back direction and in the right/left direction, thus improving a design appearance further than otherwise.

In the fourth embodiment of the present invention, the plurality of support posts may be so formed as to have the same height. In order to achieve another object of the present invention, however, it is preferable to provide end posts of a height corresponding to a rest height of the backrest, as well as intermediate support posts lower in height than the end support posts. In this case, a first support portion is provided in a near-top position of the end support post and a second support portion is provided in the lower position thereof and a second support portion similar to the second support portion of the end support post is provided in the intermediate support post such that it is situated at the same height level as the second support portion of the end support post.

The first link is composed of a pair of short links each having a base end portion reverse-rotatably pin-connected to the first support portion of the end support post and a forward end portion reverse-rotatable clear of the upper portion of the end support post. The first link is inserted between the end support post and the table panel end bracket with the base end portion of the respective link reverse-rotatably pin-connected to the first support portion of the end support post and the forward end portion of the respective link rotatably pin-connected to the intermediate pivot of the table panel end metal bracket.

The second link is composed of a plurality of long channel members having a base end portion tiltably pin-connected to the second support portion of the end support post and intermediate support post and a forward end portion extending up from the upper end of the end support post. The respective channel member is fixed within a backrest recess. The second link is incorporated between the respective support post and the respective table panel bracket with the base end portion of the channel-like link member tiltably pin-connected to the second support portion of the end support post and intermediate support post and the forward end portion of the channel-like member rotatably pin-connected to the forward end pivot of the table panel end bracket and table panel intermediate bracket.

The table end bracket has an intermediate pivot at which the forward end portion of the first link is pin-connected, a forward end pivot at which the forward end portion of the second link is pin-connected and a stopper which abuts against the upper end of the end support portion in the desk mode of use in which the table panel is held substantially erect. By the abutment of the stopper against the upper end of the end support post, the first and second links are restricted from being swung further from the horizontal position which is taken by the table panel.

If, as set forth above, the intermediate support post is made lower in height than the end support posts and the first link is provided in that higher end support post alone, then the number of the first links can be saved by the number of the intermediate support posts. It is, therefore, possible to simplify the structure of a resultant coupled chair unit as a whole when considered from such an aspect that the intermediate post is lower in height than the end support post.

DETAILED DESCRIPTION OF THE PREFERRED EMBODIMENTS

A first embodiment of the present invention will be explained below by referring to FIGS. 1 to 10.

Figure 9:
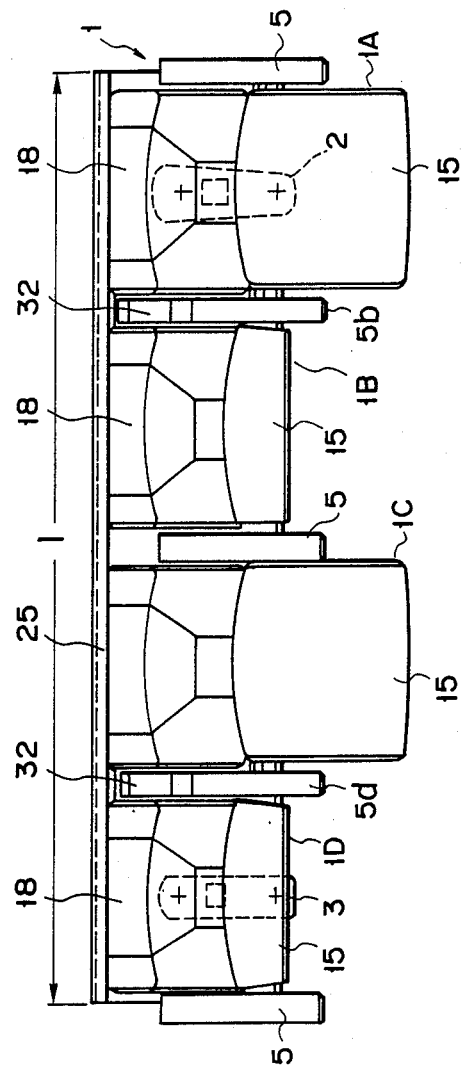
FIG. 9 is a plan view showing a whole arrangement of the coupled chair unit in a desk mode of use, two chairs of the chair unit being shown in an actual state of use and two chairs in a swung-up state.
Figure 10:
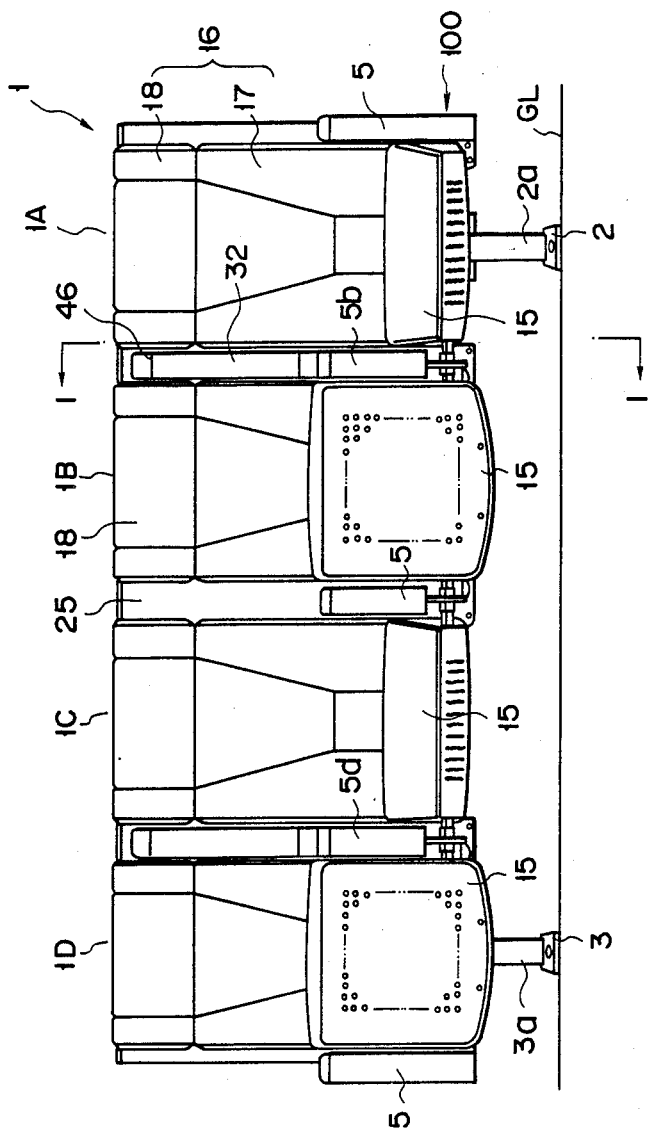
FIG. 10 is a front view of the coupled chair unit of FIG. 9.

FIGS. 9 and 10 generally show a coupled type chair unit 1 including a plurality of chairs, such as 4 to 12 chairs (4 chairs 1A to 1D in FIGS. 9 and 10), which are coupled together in a lateral direction so that persons can be seated one by one. A plurality of chair units 1 including end chairs 1A and 1D and intermediate chairs 1B and 1C each are arranged as a parallel array in a lateral direction and in a front-back direction on the floor GL of a building such as a lecture hall.

Figure 1:
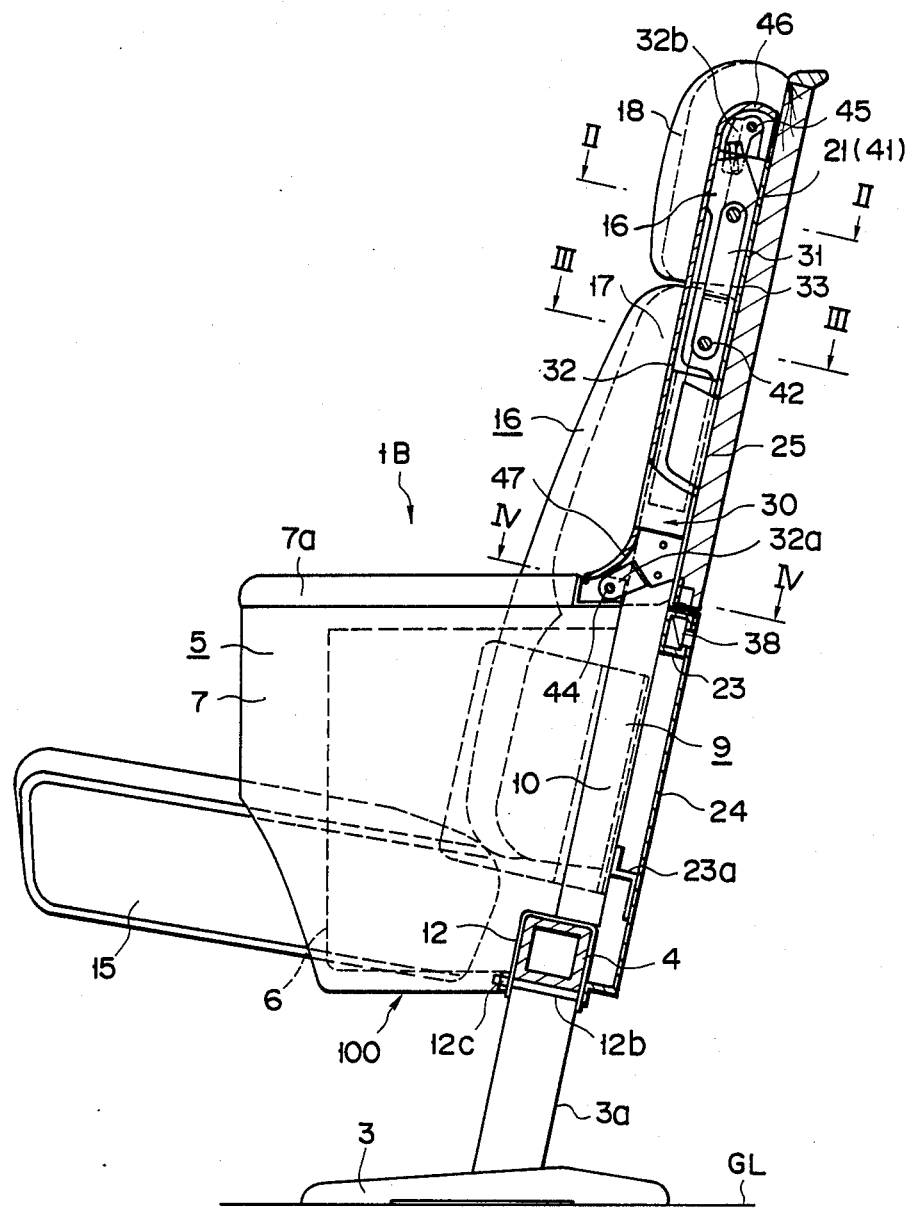
FIG. 1 is a cross-sectional view, taken along line I—I in FIG. 10, showing a major part of a coupled chair unit, in an ordinary chair mode of use, according to a first embodiment of the present invention.

FIG. 1 is a cross-sectional view, taken along line I—I in FIG. 10, showing a major part of the chair unit 1 in an ordinary mode of use. The chair unit includes a chair support means 100. The chair support means 100 comprises a plurality of legs 2, 3 having rearwardly-tiltable erect leg posts 2a, 3a and fixedly positioned on the floor GL of a chair installation site with a predetermined spacing left therebetween; a laterally-long, hollow beam member 4 of a rectangular cross-section fixed on the leg posts 2a, 3a of legs 2, 3; a plurality of armrests 5 (for example, five armrests) fixedly provided in the longitudinal direction of the beam member 4 at a predetermined chair-array interval; and two support posts 9 fixed erect on the beam member 4 such that they extend up from behind their rear positions of a plurality of armrests 5, such as two armrests spaced apart in the longitudinal direction of the beam member, for example, the second and fourth armrests 5b, 5d from the right side of the coupled chair unit 1 as shown in FIG. 10.

Figure 8:
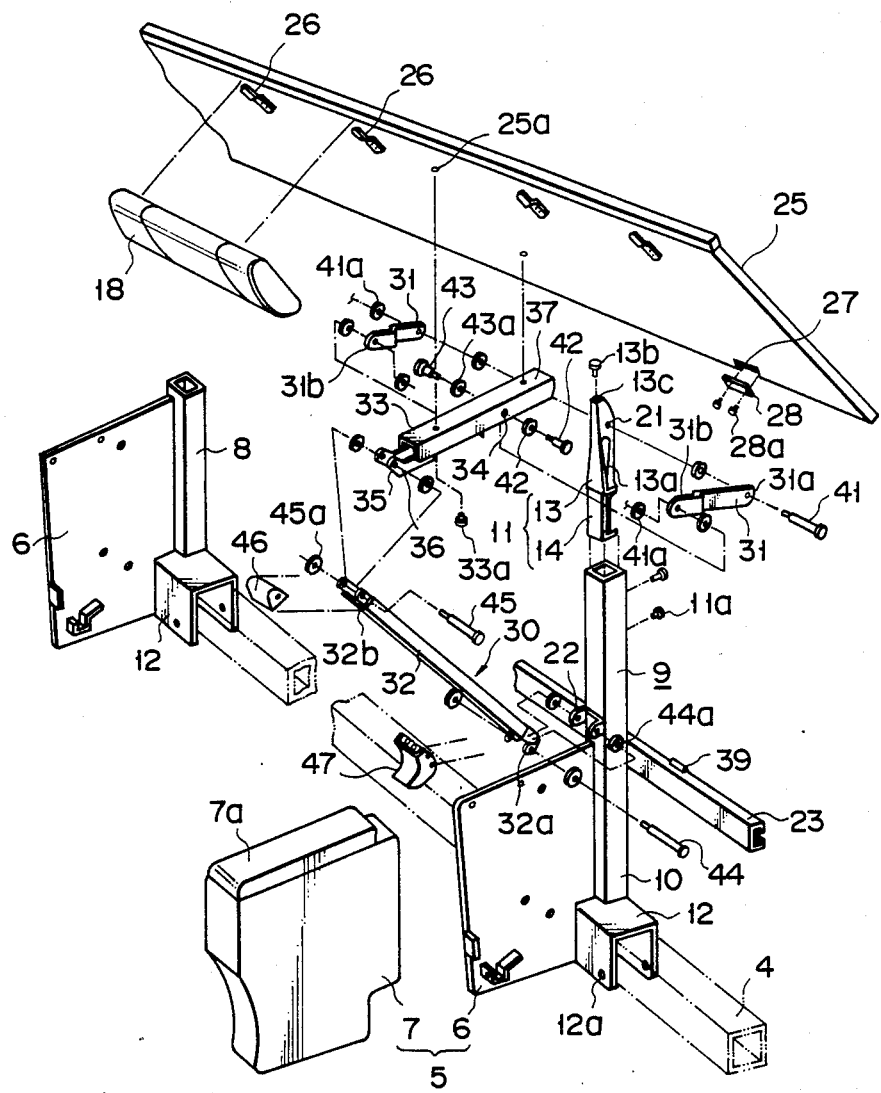
FIG. 8 is a perspective, exploded view showing a link mechanism incorporated into the coupled chair unit as well as their associated elements.

The respective armrests 5 are composed of a reinforced core plate 6 made of metal, an outer covering 7 fitted to an outside of the reinforced core metal 6 to cover the core plate 6, and an arm (lid) 7a fitted over the upper portion of the outer covering 7. The core plates 6 for the armrests 5 are welded to a lower support post 8 and higher support post 9, respectively, as shown in FIG. 8, these posts 8 and 9 being mounted uprightly on the beam member 4 and being used for the armrest and for a link, respectively.

Between the respective armrests 5, four chairs are located as shown in FIGS. 9 and 10 which are made up of the end chairs 1A, 1D and intermediate chairs 1B, 1C and tiltably supported relative to the respective adjacent armrests 5. That is, respective seats 15 are so supported that each can be automatically swung by a known automatic swing-up mechanism (not shown) from a substantially horizontal seat-available state to a substantially vertical seat-unavailable position.

Figure 2:
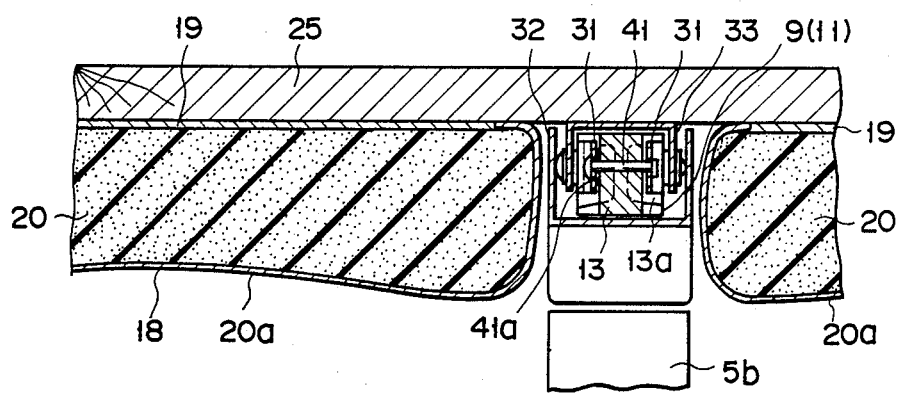
FIG. 2 is a cross-sectional view showing a major part of the chair unit, taken along line II—II in FIG. 1.

Four backrests 16 are provided above the respective seats 15, that is, above the end chairs 1A, 1D and intermediate chairs 1B, 1C. The backrest 16 is composed of a lower backrest segment 17 fixed to a backrest attachment plate (not shown) mounted between the armrests 5 and an upper backrest segment 18 located above the lower backrest segment 17 such that it is movable. The fixed lower backrest segment 17 and the movable, upper backrest segment 18 have their cushions 20 fitted on the front side of a back frame 19. The cushion 20 are covered with an upper cover 20a as shown in FIG. 2.

The support post 9 for link attachment is comprised of 2 posts fixed uprightly on the beam member 4 such that it extends up from the back portion of the armrests 5b, 5d, that is, a hollow post member 10 of a rectangular cross-section having an open upper end and a channel metal fitting 12 mounted on the lower end thereof and an upper post member 11 for a first link which is fitted into the upper open end of the hollow post member 10. The support post 9 is fixed on the beam member 4 such that it is obliquely backwardly inclined with an inclination angle of about 10° relative to a vertical axis passing through the base of the support post.

The upper post member 11 is made up of a metal member having a post fitting section 14 fitted into the upper open end of the hollow post member 10 and fixed there by a screw means 11a as shown in FIG. 8 and a link mount section 13 projected up from the post fitting section 14. Recesses 13a for link attachment are formed at both sides of the link mount section 13. A threaded hole 13c is provided at the top end of the link mount section 13 as shown in FIG. 8 such that a height adjustment screw 13b is fixed in the threaded hole 13c. The height adjustment screw 13b has a head covered with synthetic resin and is threadably fitted into the threaded hole 13c to allow its height control.

The attachment of the support post 9 to the beam post 4 is achieved by fitting the channel metal fitting member 12 which is provided on the lower end of the hollow post member 10 over the beam member 4 from above as shown in FIG. 8 and inserting bolts 12b into corresponding bolt insertion holes 12a of the mount fitting 12 as shown in FIG. 1 and fastening the bolts 12b with corresponding nuts 12c. The support post 8 is also fixed to the beam member 4 in a manner set out above.

In the upper end portion of the support post and hence that of the upper post member 11 which is located close to the upper end portion of the support post 9 and hence the upper post member 11, a pin insertion hole is formed in a manner to extend through the aforementioned upper end portion of the support post, the pin insertion hole serving as the first support section 21.

Figure 4:
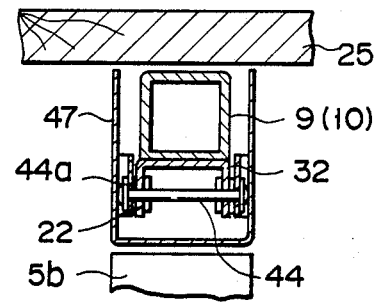
FIG. 4 is a cross-sectional view, taken along line IV—IV in FIG. 1.

In that portion of the support post which is lower than the pin insertion hole 21, that is, that lower front side portion of the hollow post member 10 which is located near to the core plate 6, a metal bracket is provided as shown in FIGS. 4 and 8 and has a pin insertion hole serving as the second support portion 22. To that rear portion of the post member 10 which is situated near to the second support portion 22, a channel-like support cross-member 23 is fixed which extends past the upper end rear side of the support post 8. A plurality of brackets 23a are mounted on the lower end rear surface of the respective support posts 9 situated in a position lower than the cross-member 23.

A lower rear decoration panel 24 is mounted on the respective bracket 23a and cross-member 23 as shown in FIG. 1 and has a length substantially equal to a coupling length of the chair unit.

At the upper rear side of the support post 9 and backrest unit 16, a table panel 25 is stored or held erect as shown in FIG. 1 and made flush with the decoration panel 24 in an ordinary use of the chair unit. The table panel 25 is made up of, for example, a flat panel having a lateral length l corresponding to a coupling length of the coupled chair unit as shown in FIG. 9. A screw 25a for mounting a table panel bracket and mount metal fitting 26 for mounting the upper backrest segment are provided, as shown in FIG. 8, at that portion of the table panel which is turned as a front side when the table is stored erect as shown in FIG. 1. By the mount metal fitting 26 and fastening screws, not shown, the upper backrest segment 18 of the backrest 16 is attached to the front side of the table panel 25 in a manner shown in FIG. 1. A latching recess 27 is cut away at each end portion of the table panel as shown in FIG. 8, that is, at that end portion of the table panel which is turned as a lower side when the table panel 25 is stored erect as shown in FIG. 1. A metal stopper 28 for locking a lock metal fitting is fastened to the latching recess 27 by a screw 28a.

Figure 3:
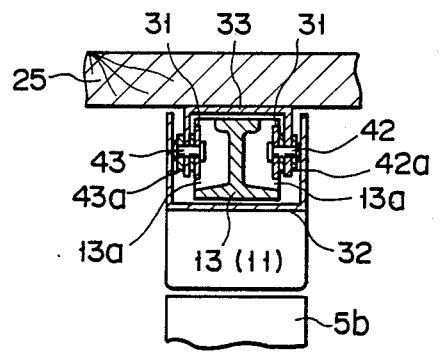
FIG. 3 is a cross-sectional view showing a major part of the chair unit, taken along line III—III in FIG. 1.
Figure 7:
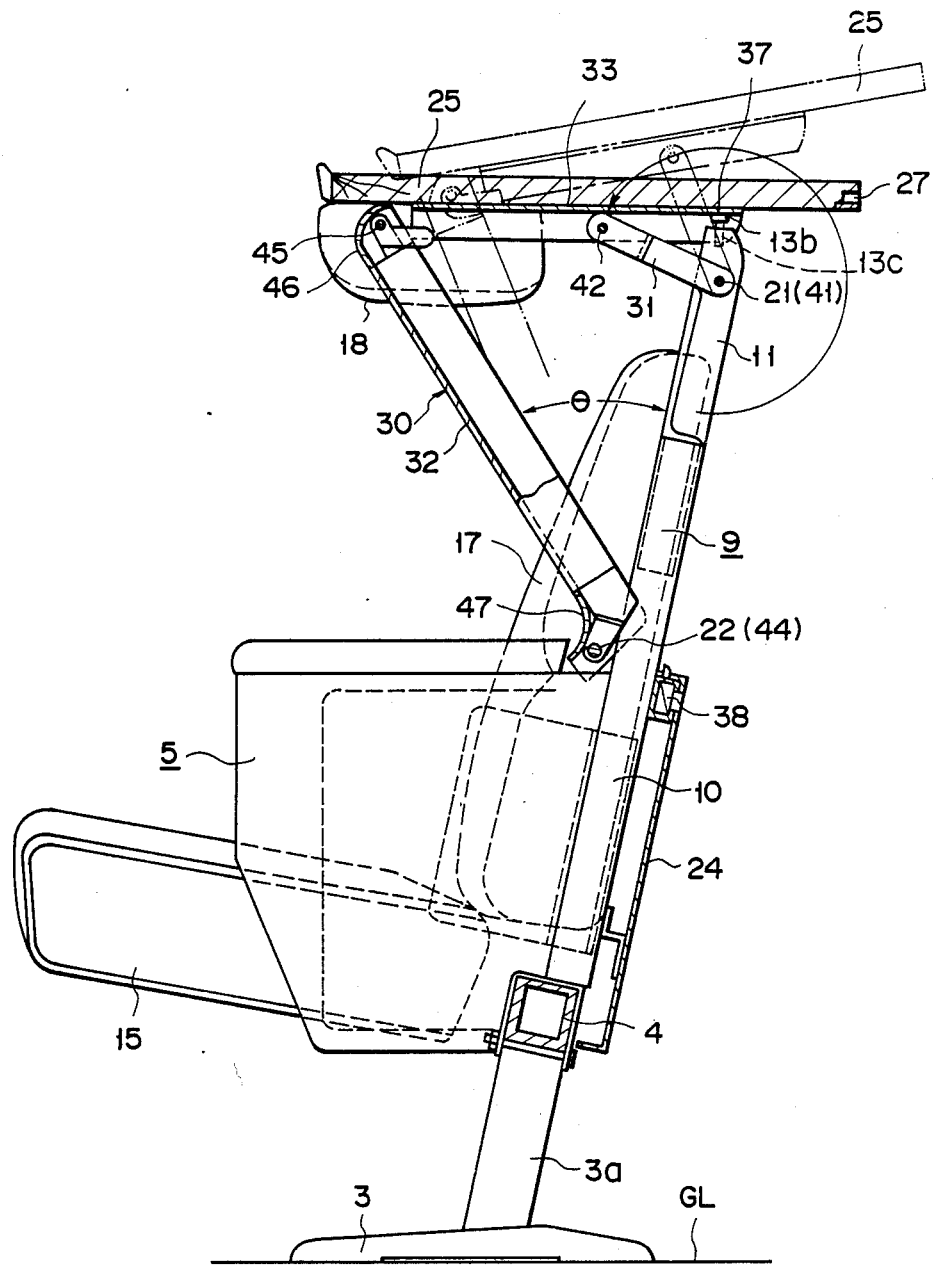
FIG. 7 is an explanation view showing the coupled chair unit in a desk mode of use.

A chair/desk conversion link mechanism 30 can made a conversion to a chair mode in which the table panel 25 is held erect as shown in FIG. 1 with the upper backrest segment 18 situated over the lower backrest segment 17 and to a desk mode in which the table panel 25 is made substantially parallel with the upper backrest segment 18 situated over the seat 15 as shown in FIG. 7. In the chair mode as shown in FIG. 1, the link mechanism 30 comprises a table panel bracket 33 of a channel-like cross-section which is fitted on the outer side of the support post 9 from behind as shown in FIGS. 2 and 3, a pair of first links 31 held between the table panel bracket 33 and the support post 9, and a second link 32 fitted over the outer side of the table panel bracket 33 from a front side as shown in FIGS. 2 and 3 and formed of a channel member for camouflaging the support post.

Stated in more detail, the table panel bracket 33 is formed of a channel member which is fixed by screws 33a to the table panel 25 at a place corresponding to the support post 9 for link mounting. In a normal chair mode, the table panel bracket 33 is fitted over the outer side of the support post 9 from behind as shown in FIGS. 2 and 3 and dimensioned to have a length somewhat smaller than the width of the table panel. In the intermediate portion of the table panel bracket 33 as viewed in the longitudinal direction, a pin insertion hole is provided to serve as an intermediate pivot 34 for pin-connecting the first link 31 thereto. In the forward end of the respective table panel bracket 33 in the longitudinal direction, is provided a forward end pivot 35 that comprises forward pin holes provided in the front end of arm members 36 for pin-connecting the second link 32 to the table panel bracket 33.

At the rear end portion of the table top bracket 33, a stopper 37 is provided which is formed of a member plate portion. In the desk mode in which the table panel 25 is held substantially at a horizontal position, the stopper 37 is abutted, as shown in FIG. 7, against the upper end portion of the support post 9, that is, against a resin-covered head of a height adjusting screw 13b which is threaded into the top end of the upper post member 11. By so doing, the table panel can be restricted by the first and second links 31 and 32 against being inclined downward from the horizontal position.

The first link 31 comprises a pair of short links, one to the left and the other to the right, having a link base portion 31a reverse-rotatably connected by a pin 41 to the first support portion 21 of the support post 9 and a crank-like forward end portion 31b which is reverse-rotatable clear of the upper end of the support post 9 (the head of the height adjusting screw 13b) as shown in FIG. 7. With the pair of links 31 placed in the recess 13a of the upper post member 11, the base portion 31a of the link 31 is pivoted by the pin 41 at the first support portion 21 and the forward end portion 31b is rotatably coupled by pins 42 and 43 to the intermediate pivot 34 of the table panel bracket 33 as shown in FIG. 3. The pair of links as set out above are set between the post member of the support post and the table panel bracket 33 as shown in FIGS. 1 and 3.

The pin 41 for pivotally supporting the link base portion 31a of the first link 31 is a link coupling pin which is inserted through the pin insertion hole 21 of the upper post member 11. The link coupling pin is thus inserted into the first insertion hole and fixed there by resetting the end of the pin. This fixing is achieved by using a plurality of spring washers 42a and 43a as shown in FIG. 3.

In the ordinary chair mode, the second link 32 is formed of a channel member which is enough long to cover, or camouflage, that upper portion of the support post extending upwardly from the armrest 5 as well as the table panel bracket 33 and first link 31. In the lower end portion of the channel member 32 a link base portion 32a is provided which is tiltably coupled by a pin 44 to the bracket 22 of the hollow post member 10. In the upper end portion of the channel member 32 extending upwardly from the support post, a link forward end portion 32b is provided which is swingably coupled by a pin 45 to the forward end pivot 35 of the table panel bracket 33.

The second link 32 has its base end portion 32a coupled by the pin 44 to the bracket 22 of the hollow post member 10 in a tiltable fashion. The forward end portion 32b of the link 32 is swingably coupled by a pin 45 to the forward end pivot 35 of the table panel bracket 33. By so doing, the second link 32 is placed between the support post 9 and the table panel bracket 32 so as to camouflage the support post 9. To the upper and lower ends of the second link 32 upper and lower link covers 46 and 47 are attached, respectively, so as to cover, as shown in FIG. 1, both the forward end portion 32b of the link which is pin-coupled to the forward end pivot 33b of the table panel bracket 33 and the base end portion 32a of the link 32 which is pin-coupled to the second support section 22. That is, the upper and lower link covers 46 and 47 are fixed there by a fastening means, such as screws.

The pin 44 around which the base end portion 32a of the second link 32 is pivotally connected is a link coupling pin which is enough long to laterally extend through the bracket 22 of the hollow post member 10. The forward end portion of the pin 44 is fixed to the bracket 22 by riveting. The fixing of the pin 44 is achieved by using a plurality of spring washers 44a at the pin insertion place as shown in FIG. 4. The pin 45 for pivotally supporting the forward end 32b of the second link 32 is a link coupling pin which is long enough to extend through the forward end pivot 35 of the table panel bracket 33. The pin 45 is riveted, in a manner similar to the pin 44, in which case a plurality of spring washers 45a are employed at the pin insertion place.

Figure 5:
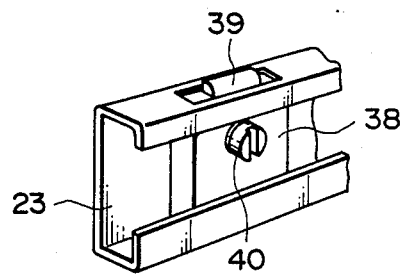
FIG. 5 is a perspective view of a lock mount section showing an arrangement of a rectangular push button lock for a table panel.

FIG. 5 shows a rectangular push button lock 38 which is incorporated into the cross-member 23. The push button lock 38 includes a table panel lock push-in/pop-out metal fitting 39 with which the metal stopper 28 for the table panel 25 engages and a push button 40 which is so pushed in as to unlock the lock metal fitting 39. The push button lock 38 serves to lock the table panel 25, which is held erect in a backward-tilting fashion, in a state as shown in FIG. 1.

Figure 6:
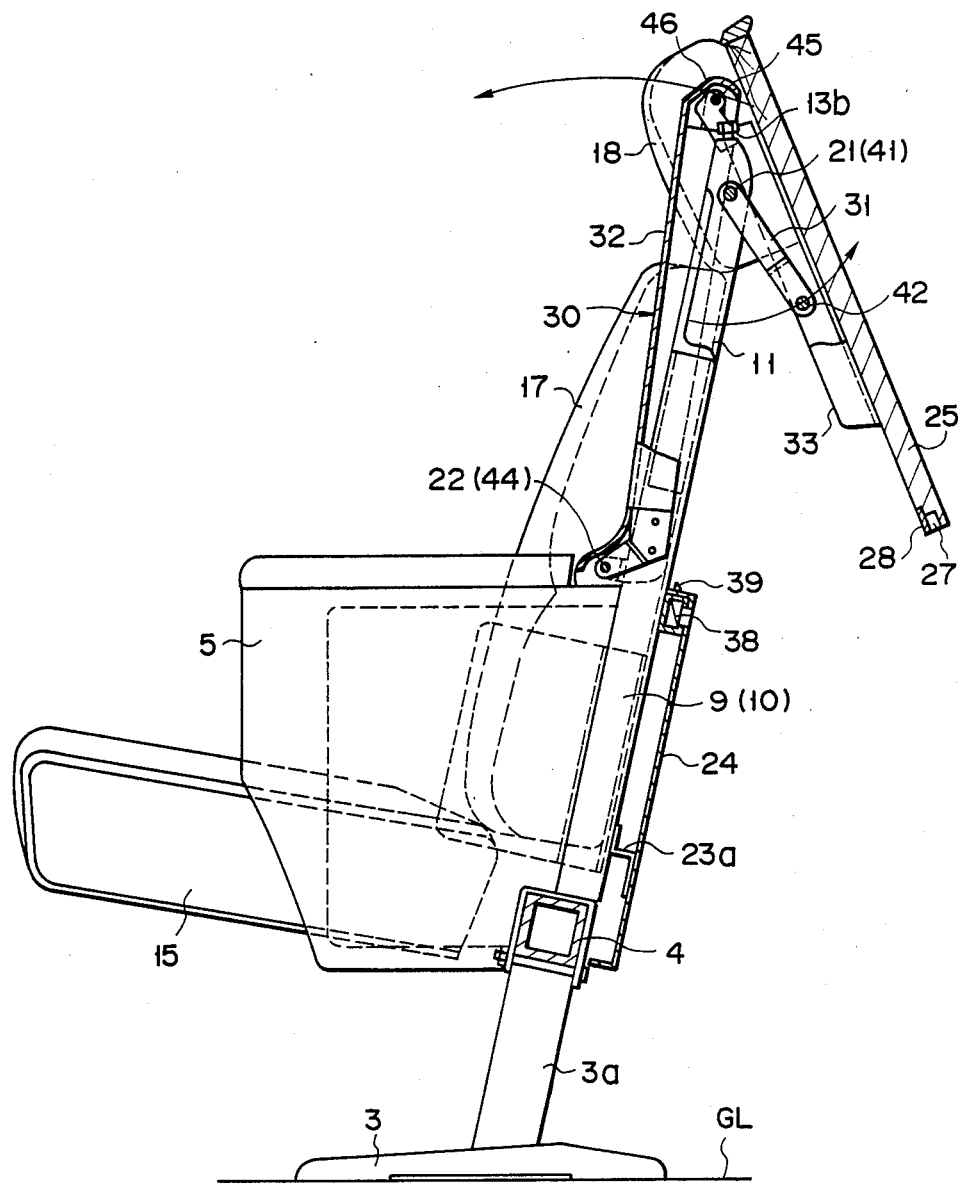
FIG. 6 is an explanation view showing an initial rotation position as taken by a table panel of the coupled chair unit.

In the coupled chair unit 1 so constructed, the table panel 25 is held erect with the upper backrest segment 18 set in the chair mode as shown in FIG. 1 and is locked by the push button lock 38. In this locked state, the push button lock 38 is operated to place the table panel 25 in an unlocked state. Then the lower end portion of the table panel 25 is manually raised at the rear side. By so doing, the second link 32 is swung in the forward direction with the second support section 22 as a center. At the same time, the first link 31 is swung with the first support portion 21 as a center as shown in FIG. 6 and the upper backrest segment-equipped table panel 25 is swung into an initial raised position as shown in FIG. 6.

With a continued raising operation of the table panel 25, the forward end 31b of the first link 31 is reverse-rotated clear of the screw head of the upper end of the support post 9 as indicated by a phantom line in FIG. 7. The table panel 25 is thus swung with the rear end raised as shown in FIG. 7 and is moved over the chair seat 15. Finally, the upper backrest segment-equipped table panel 25 is held in a substantially parallel state and, at the same time, the second link 32 for camouflaging the support post is held forward at a predetermined opening angle $\theta$ (for example, about 45°) to obtain a desk mode of use as indicated by a solid line in FIG. 7.

At this time, the stopper 37 of the table panel bracket 33 abuts against the screw head 13b at the upper end 13b of the support post 9 as shown in FIG. 7 whereby the first link 31 and second link 32 are prevented from being moved further from the horizontal position of the table panel. By so doing, the table panel 25 is held in the horizontal position and can be used as a desk for persons to be seated on a seat (not shown) on a rear array.

If the coupled chair unit 1 is brought from the desk mode as shown in FIG. 7 back to the chair mode, it is necessary to perform an operation in a reverse relation to the operation in which the chair unit is brought into the desk mode.

FIGS. 11 to 21 show a second embodiment of the present invention.

Figure 20:
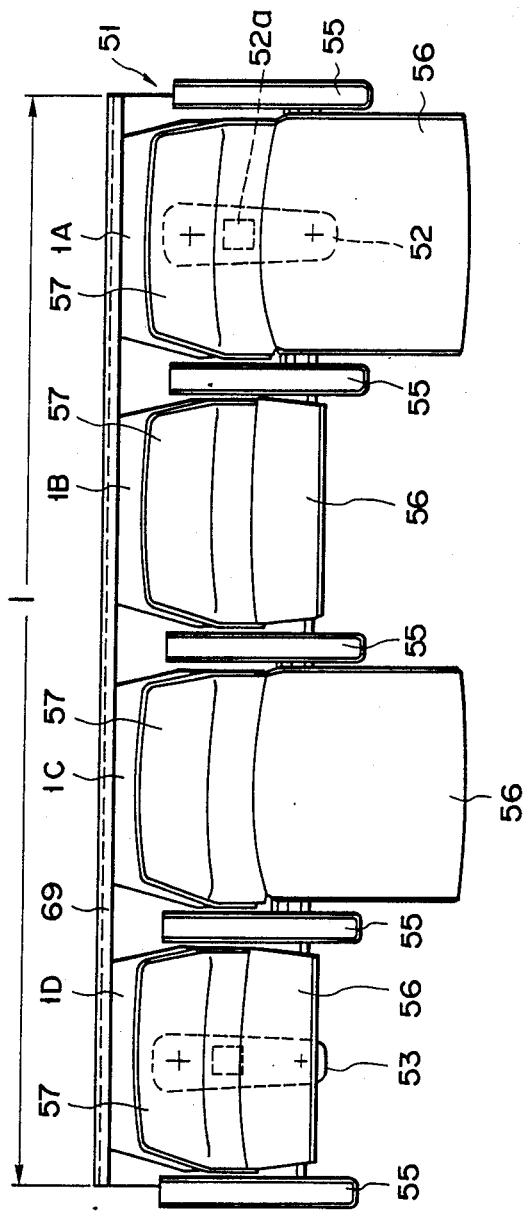
FIG. 20 is a plan view showing a whole arrangement of the coupled chair unit, with two chairs in an operative state and the remaining two chairs in a "swung-up" state.
Figure 21:
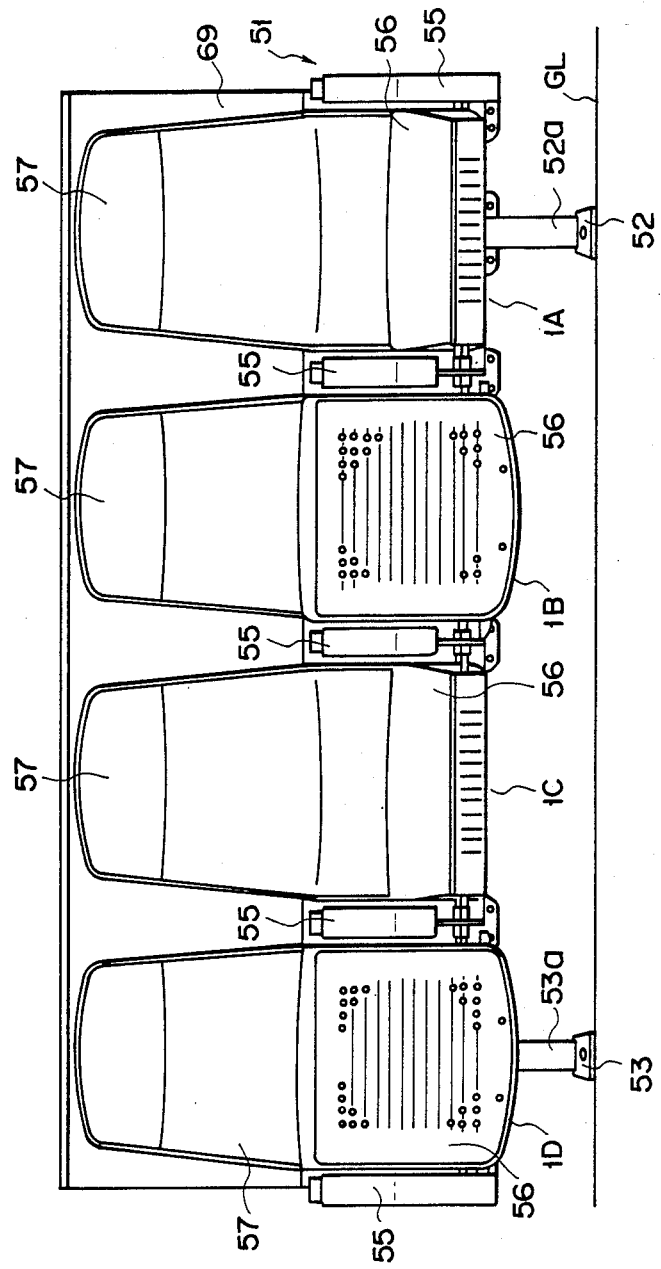
FIG. 21 is a front view showing the coupled chair unit of FIG. 20.

A coupled chair unit 51 according to the second embodiment of the present invention is shown in FIGS. 20 and 21. The chair unit 51 comprises a lateral array of, for example, 4 chairs 1A to 1D where individual persons may be seated one by one. A plurality of chair arrays having end chairs 1A and 1D and intermediate chairs 1B and 1C are arranged, as a left/right array and front/back array, on the floor space GL of, for example, a lecture hall.

The coupled chair unit 51 comprises a plurality of legs 52, 53 having backwardly-tilted leg posts 52a, 53a and fixedly arranged, at predetermined intervals, on the floor GL of an installation site, a hollow cross beam 54 laterally fixed on the leg posts 52a, 53a of the legs 52, 53 and having a rectangular cross-section in a right/left direction, and a plurality of armrests 55, say five, arranged and fixed at predetermined intervals in the longitudinal direction of the beam member 54.

Four chair seats 56 of the end chairs 1A, 1D and intermediate chairs 1B, 1C are provided between the armrests 55 and tiltably supported relative to the adjacent armrests 55. That is, the respective chair seats 56 are so supported by a known automatic swing-up mechanism (not shown) on the armrests 55 as to be automatically swingably turned from a chair mode in which the seat is held in a substantially horizontal position to an inoperative position in which the chair is held in a substantially vertical position.

In the upper positions of the respective seats 56, four backrests 57 are provided for the end chairs 1A, 1D and intermediate chairs 1B, 1C so as to permit them to be automatically swingably turned in a tiltable fashion. The chair backrest 57 comprises a backrest frame 59 having a longitudinal channel-like backrest recess 58, a cushion 60 attached to the front side of the backrest frame 59, and an upper cover 61 for covering the cushion 60.

Figure 12:
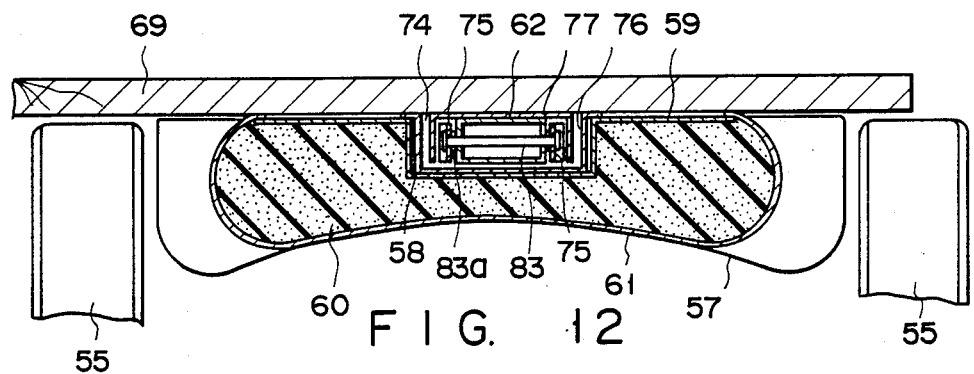
FIG. 12 is a cross-sectional view showing a major part of the chair as taken along line XII—XII in FIG. 11.
Figure 13:
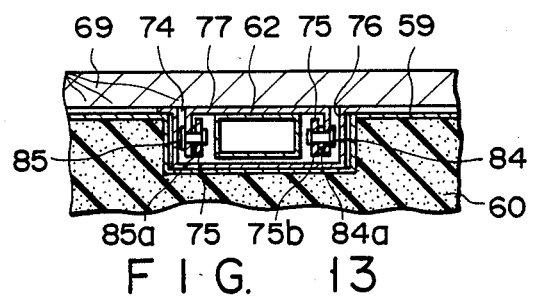
FIG. 13 is a cross-sectional view showing a major cross-section of the chair as taken along line XIII—XIII in FIG. 11.
Figure 14:
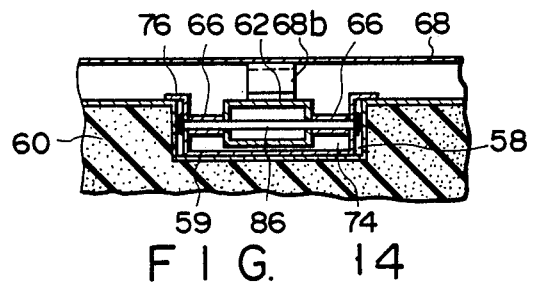
FIG. 14 is a cross-sectional view showing a major part of the chair as taken line XIV—XIV in FIG. 11.

End support posts 62 equipped with a beam metal clamp 62a and intermediate support post 63 equipped with a channel metal fitting 63a are fitted over the beam member 54 in a positional relation to the backrest recess 58 of the chair backrest 57. The end support post 62 and intermediate support post 63 are each formed of a hollow post member of such a laterally extending rectangular cross-section as is capable of being placed within the backrest recesses 58. These posts are uprightly fixed in a diagonally rearward direction at an inclination angle of about 10° to a vertical axis passing through the base of the support post. The posts 62 and 63 have a lateral width which is set to be smaller than the channel width of the backrest recess 58. With the support posts 62, 63 held within the backrest recess 58, a link storage area 74 is provided between the backrest recess 58 and the support post 62 or 63 as shown in FIGS. 12 to 14.

Figure 11:
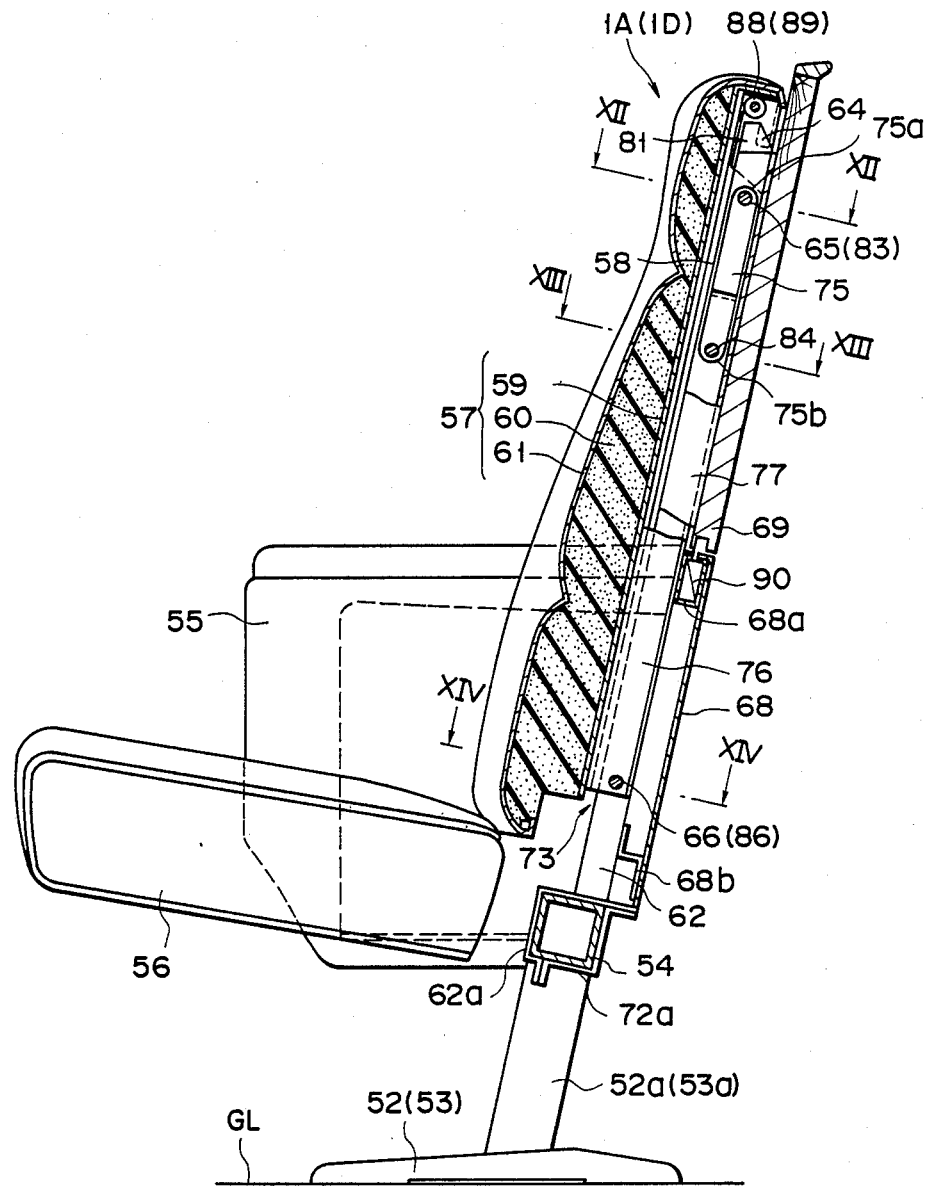
FIG. 11 is a diagrammatic view showing a portion of a coupled chair unit according to a second embodiment of the present invention with the end chair in an ordinary chair mode of use.

The end support posts 62 are fixedly fitted over the beam member 54 by fastening the beam clamps 62a and 72a on the cross member 54 by a fastening means (not shown), such as a plurality of bolt/nut combinations, as shown in FIG. 11, the beam clamp 62a being provided on the lower end of the end support post 62 and the beam clamp 72a gripping the beam member 54. The attachment of the intermediate support post 62 to the beam member 54 is achieved by fitting the channel metal fitting 63a which is provided on the lower end of the intermediate support post 63 over the beam member 54 from above as shown in FIG. 19 and clamping it to the beam member 54 by a fastening means, such as a plurality of screws (not shown).

The hollow post member of the end support post 62 has a height of rest relative to the backrest 57 and a link receiving member 64 is fitted on the upper end of the end support post 62 and made of plastics. In the upper end portion of the end support post 62, a pin insertion hole which serves as the first support portion 65 is provided near to the link rest member 64. To the portion of the end support post 62 which is lower than the position of the pin insertion hole 65, that is, near to the chair seat 56, a projecting pipe which provides a second support portion 66 is welded in a manner to be projected as shown in FIGS. 14 and 19.

The intermediate support post 63 is formed of a lower hollow post member than the end support post and equipped at an upper end with a bracket 67. Like the second support portion 66 of the end support post 62, the intermediate support post 63 has a second support portion 66' which is welded to the intermediate support post 62 at the same height level as that of the second support portion 66 of the end support post 62, the second support portion extending as shown in FIG. 19.

Figure 19:
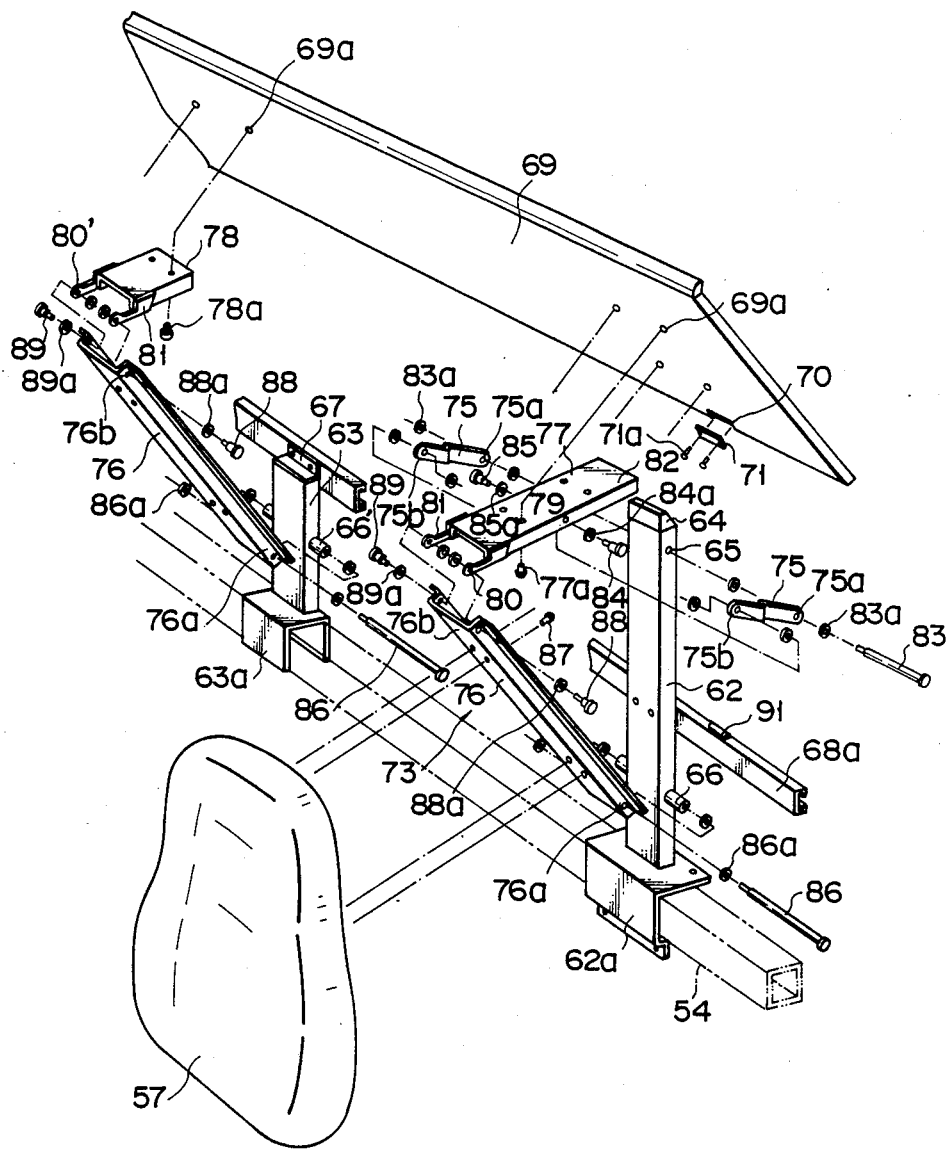
FIG. 19 is a perspective, expanded view showing a link mechanism incorporated into the chair of the coupled chair unit as well as the associated elements.

The upper end bracket 67 of the intermediate support post 63 is screw-threaded into a channel-like support cross member 68a at an intermediate position of the rear side of the support post 62 as shown in FIG. 19. A bracket 68b as shown in FIG. 11 is attached to the back surface of the lower end of the respective support posts 62, 63 which is situated below the support post cross member 68a. A back-decoration panel 68 is mounted on the bracket 68b and cross member 68a in a manner parallel to the support posts 62, 63 and has substantially the same length as that of the coupled chair unit as shown in FIGS. 11 and 16.

Figure 16:
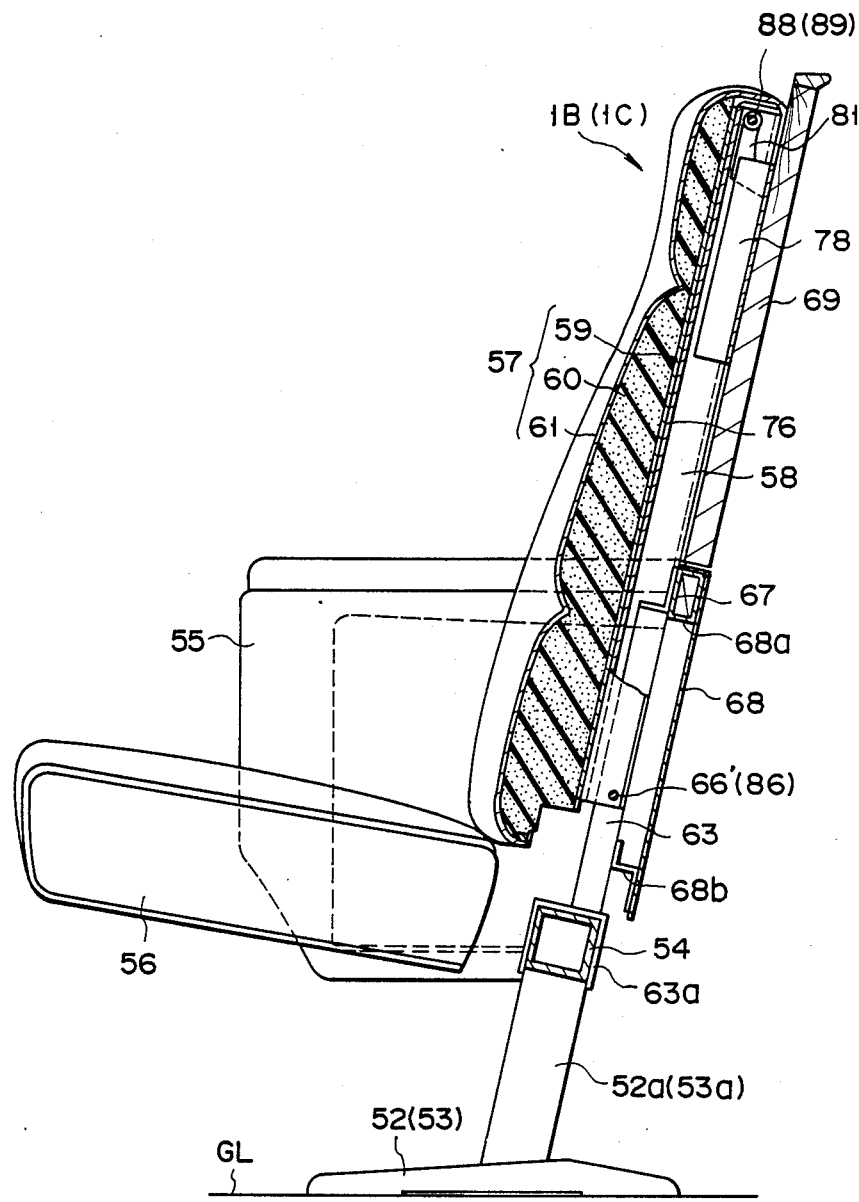
FIG. 16 is a diagrammatic view showing a cutout major part of an intermediate chair portion of the coupled chair unit.

A table panel 69 is stored or held erect on the rear side of the support posts 62, 63 and backrest 57 as shown in FIGS. 11 and 16 and made flush with the decoration panel 68 when the chair unit is used in an ordinary chair mode. The table panel 69 is made of flat plywood having a length l corresponding to that of the coupled chair unit as shown in FIG. 20. In that portion of the table panel 69 which is turned as a front side when the table panel is stored or held erect as shown in FIG. 19, a screw hole 69a for mounting a table panel bracket is provided as shown in FIG. 19. A latching recess 70 is provided at each end portion of the table panel 69 which is situated at the lower side when the table panel 69 is held erect. A metal stopper 71 is locked by screws 71a to the latching recess 70.

Figure 18A:
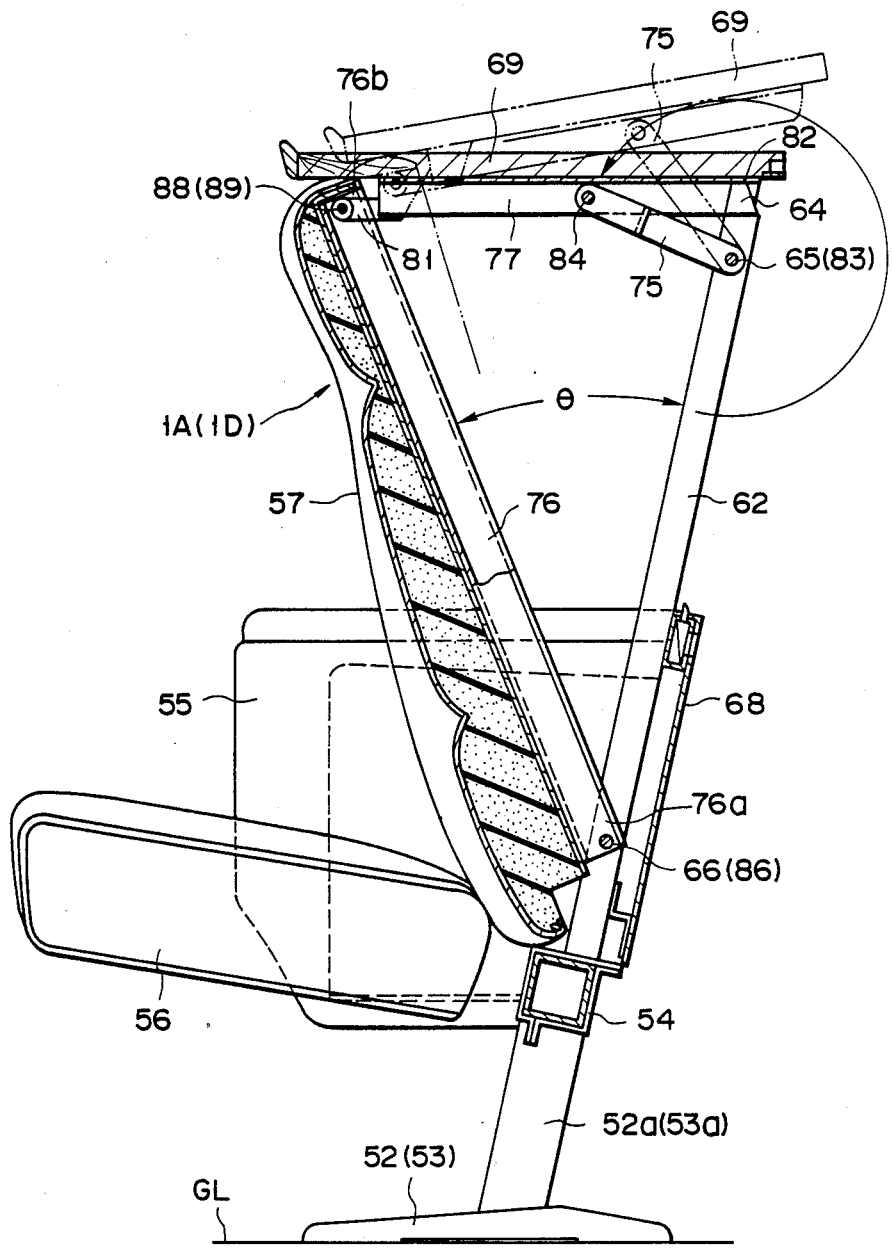
FIGS. 18A and 18B are explanation views showing the end chair portion and intermediate chair portion, respectively, in a desk mode of use.
Figure 18B:
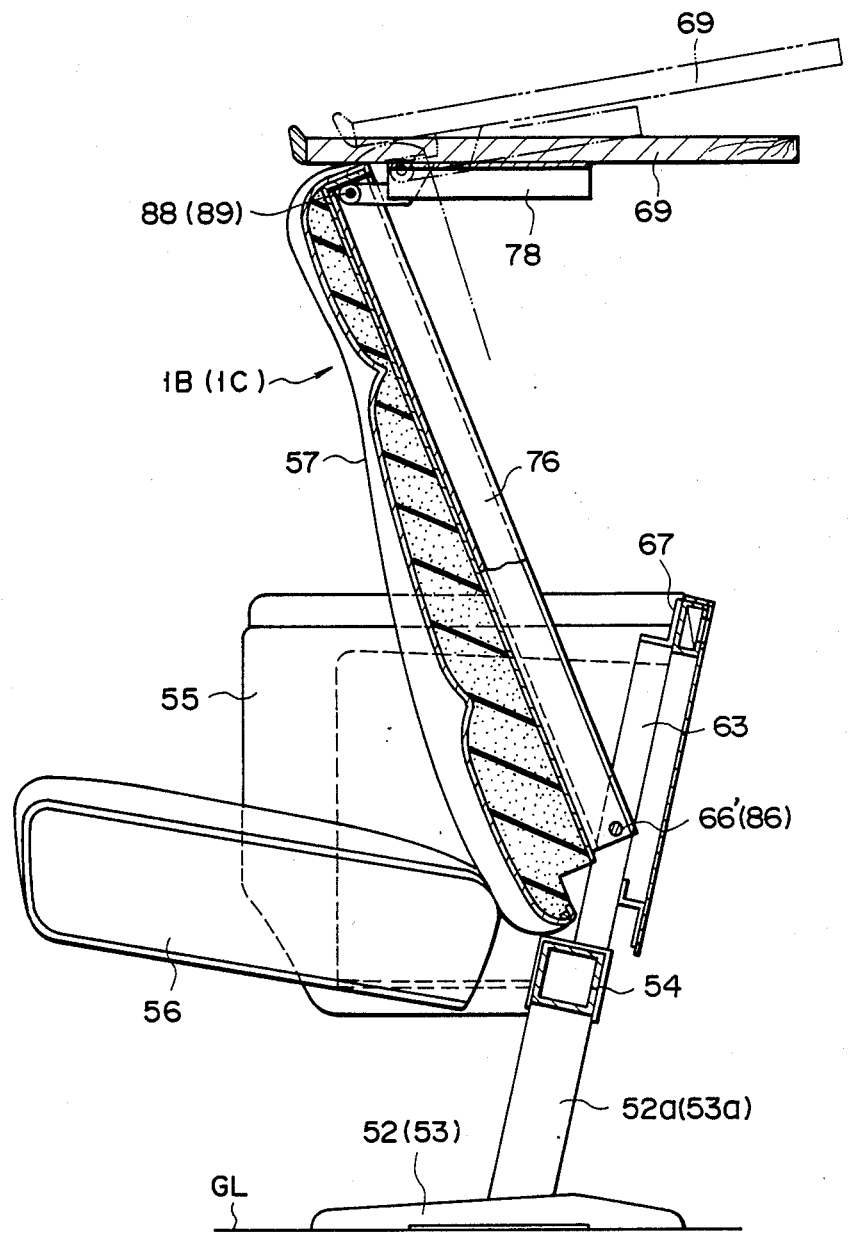

A link mechanism 73 for converting the chair unit to a chair mode or to a desk mode functions to allow the table panel 69 and chair backrests 57 to be converted to a chair mode in which they are held erect as shown in FIGS. 11 and 16 or to a desk mode in which the table panel 69 is held substantially horizontal with the backrest 57 tilted forward as shown in FIGS. 18A and 18B.

In the ordinary chair mode a shown in FIGS. 11 and 16, the link mechanism 73 comprises first links 75 of a smaller length and second links 76 of a greater length, both types of which are stored in compact form in the link storage section 74 provided between the backrest recess 58 and the support posts 62, 63 so that they are hidden from view as shown in FIGS. 12 to 14, and table panel end brackets 77 and table panel intermediate bracket 78 which pivotally support the forward end portion of the first and second links 75, 76.

Stated in more detail, the table panel bracket 77 is made up of a channel member which is fixed by screws 77a to the table panel 69. That is, the table panel end bracket 77 is adapted to be fitted over the outside of the end support post 62 from behind with a link storage space left as shown in FIGS. 12 and 14 and has a length which is somewhat smaller than the width of the table panel. An intermediate pivot 79 for pin-connection of the first link 75 is provided as a pin insertion hole at an intermediate portion of the length of the bracket 77. A forward end pivot 80 for pin-connection of the second link 76 is provided at the forward end of the length of the table panel bracket 77 and formed as a pin hole of an arm member 81. A stopper 82 is provided at the rear end of the table panel end bracket 77 so that, in the desk mode in which the table panel is held substantially horizontal, it abuts against a link receiving member 64 of the end support post 62 as shown in FIG. 18A whereby the first link 75 and second link 76 are restricted from being rotated further from the horizontal position taken by the table panel.

The intermediate metal bracket 78 is substantially similar to the end bracket 77 in that it is formed of a channel member fixed by screws 78a to the table panel 69 and that it has substantially the same cross-section as that of the end bracket. However, they somewhat differ in that the intermediate bracket 78 is shorter in length than the end bracket 77 and that the forward end pivot 80' for pin-connection of the second link 76 is provided at the forward end of the intermediate bracket 78 such that it is provided as the forward end hole of the end arm member 81.

The first links 75 are formed of a pair of reverse-rotatable short pins including a link base portion 75a reverse-rotatably connected by a pin 83 to the first support portion 65 of the end support post 62 as shown in FIG. 12 and a crank-like forward end portion 75b which passes clear of the upper portion of the link receiving member 64 of the end support post 62. The forward end portion 75b of the link 75 is rotatably coupled by pins 84, 85 to the intermediate pivot 79 of the end bracket 77, as shown in FIG. 13, at a location between the end support post 62 and the table panel end bracket 77 so that it is hidden from view.

A pin 83 for pivotally supporting the base end portion 75a of the first link 75 is a coupling pin which is long enough to be inserted through the pin insertion hole 65 at the upper end portion of the support post 62 and has its forward end riveted with a spring washer 83a inserted therebetween as shown in FIG. 12.

Pins 84 and 85 for pivotally supporting the forward end portion 75b of the first link 75 is a shorter link coupling pin extending through the intermediate pivot 79 of the end bracket 77 and has its forward end riveted with spring washers 84a, 85a inserted therebetween, as in the case of the pin 83, as shown in FIG. 13.

The second links 76 are four long channel members having a base end portion 76a tiltably coupled by a pin 86 to a second support portion (66, 66') of the support post (62, 63) and a forward end portion 86b extending up from the upper end of the support post 62. The channel member 76 is fitted into the backrest recess 58 and fixed by a screw 87 to the backrest frame 59. The second links 76, 76 have their forward end portions 76b, 76b rotatably coupled by pins 88, 89 to the pivots 80, 80' of the end bracket 77 and intermediate bracket 78, respectively, and are incorporated one between the end support post 62 and end bracket 77 and one between the support post 63 and the intermediate bracket 78 so as to be hidden from view.

A pin (86, 86) for pivotally supporting the base end 76a of the second link 76 is a link connecting pin which is long enough to extend through a corresponding projecting pipe (66, 66') at the lower end portion of the support post. The forward end portion of the link connecting pin is riveted to the second link with a plurality of spring washers 86a inserted therebetween.

A pin (86, 89) for pivotally supporting the forward end 76b of the second link 76 is a link connecting pin which is short enough to extend through the pivots 80, 80' of the end bracket 77 and intermediate bracket 78. The forward end portion of the link connecting pin is riveted to the second link with a plurality of spring washers 88a, 89a inserted therebetween as in the case of the pin 86.

Figure 15:
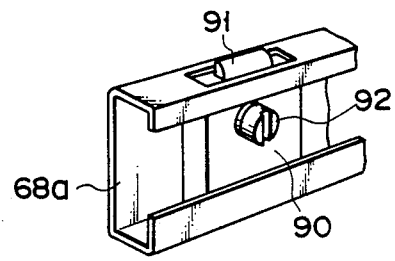
FIG. 15 is a perspective view of a lock mount section showing an arrangement of a rectangular push button lock for a table panel.

FIG. 15 shows a structure having a rectangular push button lock 90 which is incorporated into the cross member 68a. The push button lock 90 comprises a table panel lock push-in/pop-out metal fitting 91 for engaging with the metal stopper 71 of the table panel 69 and a push button 92 which, when it is pushed in, unlocks the table panel lock metal fitting 91. The push button lock 90 is adapted to lock the table panel 69 in a state held erect in a backward-tilting fashion, that is, in a state shown in FIGS. 11 and 16.

The coupled chair unit 51 thus constructed is held erect in the ordinary chair mode with the backrest 57 and table panel 69 held erect as shown in FIGS. 11 and 16 and that state of the coupled chair unit is locked by the rectangular push button lock 90. In this state, the push button lock 90 is pushed in and table panel 69 is unlocked. The lower end portion of the table panel 69 is manually raised at the rear side.

Figure 17A:
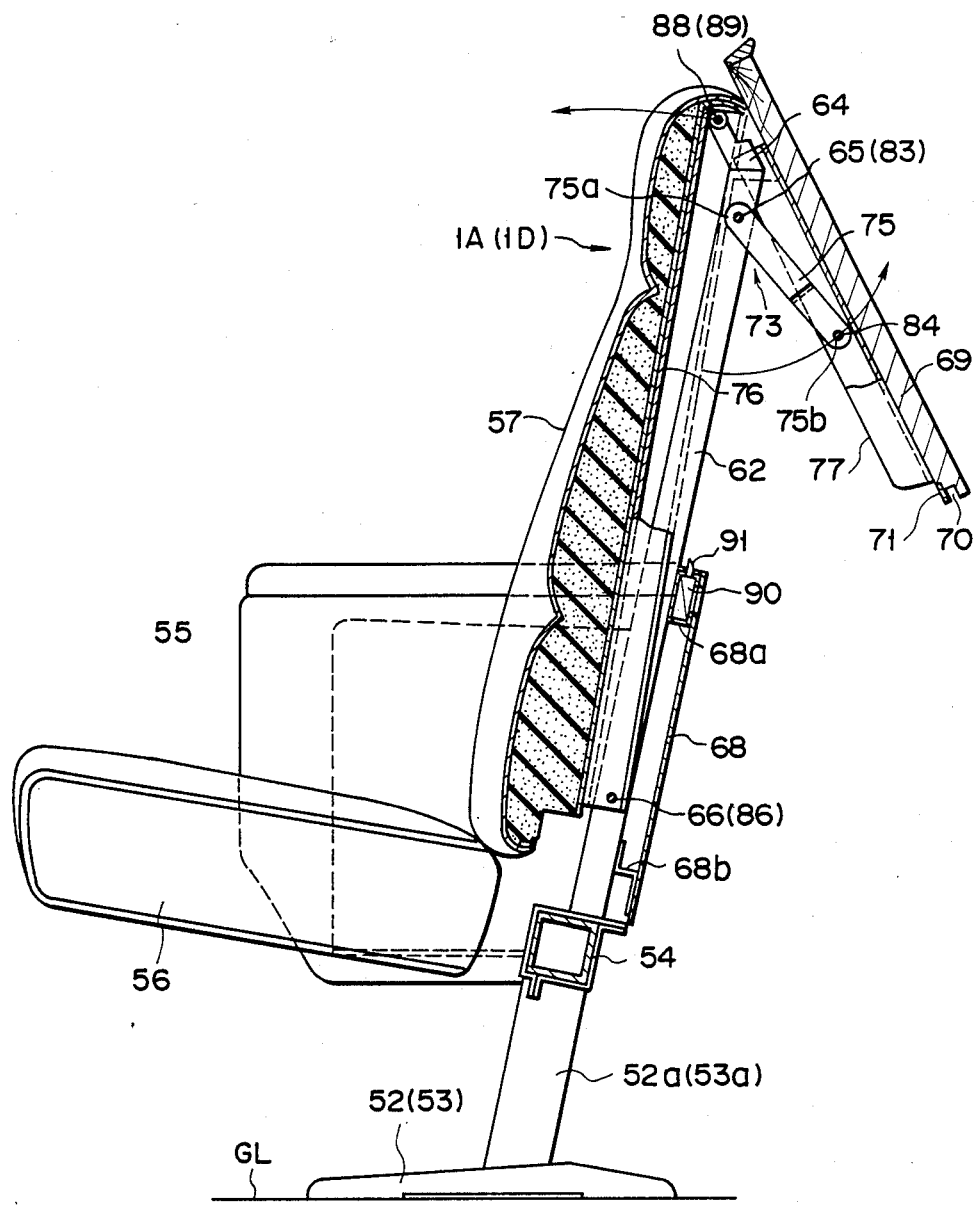
FIGS. 17A and 17B are explanation views showing the end chair portion and intermediate chair portion, respectively, in an initial state of rotation.
Figure 17B:
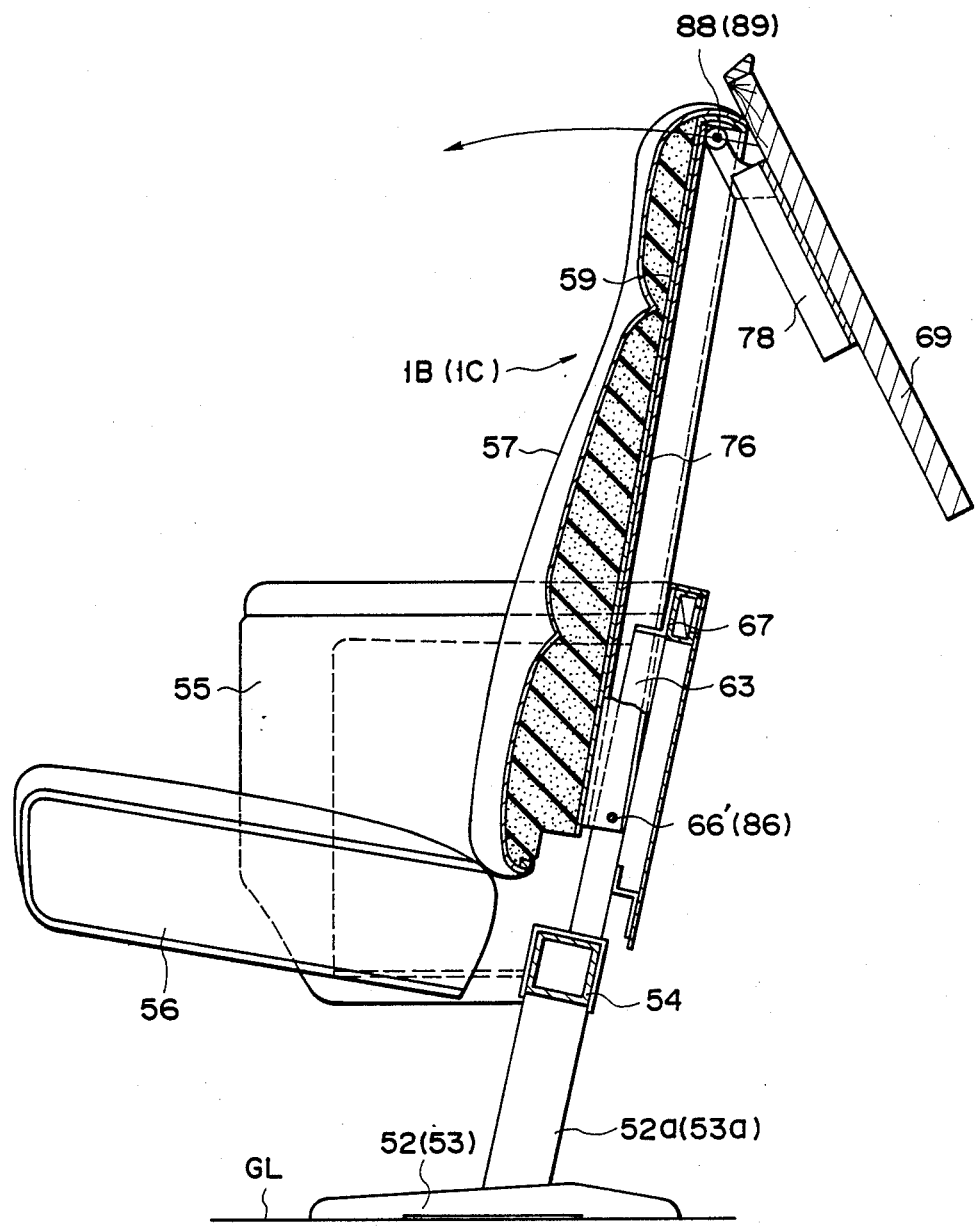

By so doing, the second links 76, 76 are rotated in a forwardly tilting direction with the second support portions 66, 66' as a center. At the same time, the first links 75, 75 are rotated with the first support portion 65 as a center as shown in FIG. 17A. By so doing, the end chairs 1A, 1D and intermediate chairs 1B, 1C have their backrests 57 tilted in the forward direction and are brought back to an initial raised position as shown in FIGS. 17A and 17B.

With a continued rotation of the table panel 69, the forward end portions 75b, 75b of the first links 75 are reverse-rotated clear of the upper portion of the link receiving member 64 as shown in a phantion line in FIG. 18A. At that time, the table panel 69 is rotated to a back-raised state so that it may be moved over the chair seat 56. Finally, the table panel 69 is held substantially horizontal and the backrest 57 and second link 76 are tilted, in the forward direction, at a predetermined angle θ, such as an angle of about 35°, as indicated by a solid line in FIGS. 18A and 18B. It is thus possible to obtain a desk mode.

At this time the stopper 82 of the end bracket 77 abuts against the link receiving member 64 at the upper end of the end support post 62 as shown in FIG. 18A whereby the first link 75 and second link 76 are prevented from being turned further from the horizontal position which is taken by the table panel. It is thus possible to held the table panel 69 in the horizontal position and for persons to be seated on a rear chair unit, not shown, with that table panel as a desk.

If the coupled chair unit 51 regained from the desk mode as shown in FIGS. 18A and 18B back to the chair mode as shown in FIGS. 11 and 16, it is only necessary to perform an operation in a reverse relation to the aforementioned operation for a chair mode.

What is claimed is:

1. A coupled chair unit for effecting a conversion to a desk mode and to a chair mode in which persons can be seated one by one, comprising:

chair support means composed of a plurality of legs fixedly arranged in a predetermined interval on a floor of a chair unit installation site, a beam member mounted on the plurality of legs, a plurality of armrests fixedly mounted on the beam member at a predetermined chair array in a longitudinal direction of the beam, a plurality of support posts fixedly mounted erect on the beam member and extending up from behind at least two of the plurality of armrests and arranged in a spaced-apart relation in the longitudinal direction of the beam member, and chair support means having a first support portion provided at a near-top portion of the respective support post and a second support portion located at a place near to the armrest of the support post;

a plurality of chair seats provided between the adjacent armrests of the chair support means and tiltably supported relative to the opposite armrests;

a plurality of backrests having a fixed lower backrest segment and movable upper backrest segment which are located above the chair seat;

an upper backrest segment-equipped table panel having a length corresponding to that of the coupled chair unit and having the upper backrest segment fixed at the front side, the table panel being held upright behind the support post and chair backrest in an ordinary chair mode of use; and a link mechanism capable of moving the upper backrest segment-equipped table panel to the ordinary chair mode of use in which the table panel is held erect behind the support post and chair backrest with the movable upper backrest segment situated above the fixed lower backrest segment and to a desk mode of use in which the table panel is held substantially parallel with the movable upper backrest segment located over the chair seat, the link mechanism which comprises:

a plurality of table panel brackets of a channel cross-section having an intermediate pivot and forward end pivot and a stopper for holding the table panel horizontal and adapted to be fixed in a position corresponding to the support post of the table panel so as to be fitted over an outside of the support post from behind;

a plurality of first links of short length each having a base end portion it is reverse-rotatably pin-connected to the first support post and a forward end portion it is reverse-rotatably moved clear of the support post, the base end portion of the first link being reverse-rotatably pin-connected to the first support portion of the support post so as to be stored between the table panel bracket and the support post and the forward end portion of the first link being rotatably pin-connected to the intermediate pivot of the table panel bracket in the ordinary chair mode of use; and a plurality of second links of long length each having a base end portion it is tiltably pin-connected to the second support portion of the support post and a forward end portion extending up from the support post, the second links being of such a type that, in order to provide an outer camouflage in the ordinary desk mode of use, the base end portion is tiltably pin-connected to the second pivot and the forward end portion rotatably pin-connected to the forward end pivot of the table panel bracket.

2. The coupled chair unit according to claim 1, wherein said plurality of second links each have a pair of link covers, upper and lower, which cover the forward end portion pin-connected to the forward end pivot of said table panel bracket and a base end portion pin-connected to the second support portion so that both the forward end portion and base end portion are hidden from view.

3. The coupled chair unit according to claim 1, wherein said support post is composed of a hollow post member of a rectangular cross section having second support portion and an open end and uprightly fixed on said beam member and an upper post member having a first support portion and fitted into the upper open end of said hollow post member and said upper post member has a support fitting portion fitted into the upper open end of said hollow post member and a link fitting portion extending up from the support fitting portion with a link fitting recess provided at each side of the link fitting portion, said upper post member being made of metal.

4. A coupled chair unit capable of a conversion to a chair mode of use in which persons can be seated one by one on a seat unit and to a desk mode of use, comprising:

a plurality of legs fixedly arranged in a predetermined interval on a floor of a chair unit installation site and a beam member mounted on the plurality of legs;

a plurality armrests fixedly mounted at a predetermined chair array in a longitudinal direction of the beam member;

a plurality of chair seats provided between the adjacent armrests and tiltably supported relative to the opposite armrests;

a plurality of chair backrests having a longitudinally extending channel-like recess at the middle of the rear side thereof and tiltably rotatable above the upper rear side of the chair seat;

a plurality of support posts uprightly fixed on the beam member in a position corresponding to the backrest recess of the chair backrest and a link storage section provided between the support post and the backrest recess;

a table panel having a length corresponding to that of the coupled chair unit and adapted to, in the ordinary chair mode of use, be held upright behind the support post and chair backrest; and a link mechanism adapted to convert the coupled chair unit to the ordinary chair mode of use in which the table panel and chair backrests are held erect and to the desk mode of use in which the table panel is held substantially horizontal with the chair backrest forwardly tilted, said mechanism comprising a plurality of first short links and plurality of long second links and table panel brackets for pivotally supporting the first and second links and all of them are compactly stored between the corresponding backrest recess and the corresponding support post so that they are hidden from view in an ordinary desk mode of use.

5. The coupled chair unit according to claim 4, wherein said support posts comprise end support posts having a chair backrest receiving height, and having a first support portion situated in an upper position and a second support portion situated in a lower position, and intermediate support posts lower in height than the end support posts and having a second support portion which is situated at the same height as that of the second support portion of said support post and is similar to the second support post of the end support post; said table panel brackets comprise table panel end brackets of a channel-like cross-section having an intermediate pivot, end pivot and stopper for holding the table panel horizontal and fixed on the table panel in a position corresponding to the end support post so as to be fitted over an outer side of the support post from behind in the ordinary desk mode of use and table panel intermediate brackets of a channel-like cross-section having a forward end pivot and fixed on the table panel in a position corresponding to the intermediate support post; said first short links have a base end portion reverse-rotatably pin-connected to the first support portion of the end support post and a forward end portion reverse-rotatable clear of the upper portion of the end support post, the base end portion of the first link being reverse-rotatably pin-connected to the first support portion and the forward end portion of the first link being rotatably pin-connected to the intermediate pivotal portion of the table panel end bracket, the first link being inserted between the end support and the table panel end bracket; and said second long links are made of channel-like members having a base end portion tiltably pin-connected to the second support portion of the end support post and intermediate support post and a forward end portion projecting up from the top end of the end support post and the channel-like member is fitted into the backrest recess with the base end portion tiltably pin-connected to the second support portion of the end support post and intermediate support post and the forward end portion rotatably pin-connected to the forward end pivot of the table panel end bracket and table panel intermediate bracket so that the channel-like member may be inserted between the end support post and the table panel end bracket and between the intermediate support post and the table panel intermediate bracket.

* * * * *